United States Patent
Chiang et al.

(10) Patent No.: US 7,548,903 B2
(45) Date of Patent: Jun. 16, 2009

(54) METHOD AND APPARATUS FOR AUTOMATIC RECOMMENDATION AND SELECTION OF CLUSTERING INDEXES

(75) Inventors: Fei Yen Chiang, Toronto (CA); Leslie Anne Cranston, Toronto (CA); Sam Sampson Lightstone, Toronto (CA); Daniele Costante Zilio, Georgetown (CA)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 11/033,327

(22) Filed: Jan. 11, 2005

(65) Prior Publication Data

US 2006/0155681 A1 Jul. 13, 2006

(51) Int. Cl.
*G06F 17/30* (2006.01)
(52) U.S. Cl. .................................. 707/2; 707/100; 707/3
(58) Field of Classification Search .................. 707/1–4, 707/101–102
See application file for complete search history.

(56) References Cited

U.S. PATENT DOCUMENTS

| | | | |
|---|---|---|---|
| 5,551,027 A | 8/1996 | Choy et al. ................. 395/600 |
| 5,778,353 A | 7/1998 | Schiefer et al. ................. 707/2 |
| 5,864,857 A * | 1/1999 | Ohata et al. ................. 707/100 |
| 5,887,274 A | 3/1999 | Barry et al. ................. 707/202 |
| 5,913,206 A * | 6/1999 | Chaudhuri et al. ............. 707/2 |
| 5,913,207 A * | 6/1999 | Chaudhuri et al. ............. 707/2 |
| 5,950,186 A * | 9/1999 | Chaudhuri et al. ............. 707/2 |
| 5,960,423 A * | 9/1999 | Chaudhuri et al. ............. 707/2 |
| 6,026,412 A | 2/2000 | Sockut et al. ............... 707/200 |
| 6,081,799 A | 6/2000 | Beavin et al. ................. 707/2 |
| 6,223,171 B1 * | 4/2001 | Chaudhuri et al. ............. 707/2 |
| 6,356,891 B1 * | 3/2002 | Agrawal et al. ................. 707/2 |
| 6,470,344 B1 * | 10/2002 | Kothuri et al. ............... 707/100 |
| 7,080,081 B2 * | 7/2006 | Agarwal et al. ............. 707/100 |
| 2002/0138466 A1 | 9/2002 | Arning et al. ................. 707/1 |
| 2004/0215626 A1 * | 10/2004 | Colossi et al. ............. 707/100 |

* cited by examiner

*Primary Examiner*—Pierre M Vital
*Assistant Examiner*—Christopher J Raab
(74) *Attorney, Agent, or Firm*—Yee & Associates, P.C.; Greg Plow

(57) ABSTRACT

A method, apparatus, and computer instructions for selecting and recommending of clustering indexes are provided. Baseline run time cost estimates are calculated based on database designs. Workload benefit of a candidate clustering design is calculated and compared to the baseline costs. If the workload benefit outweighs the baseline costs, clustering dimension solutions originated from the record identifier (RID) based index are identified. A clustering design is selected based on the identified clustering dimension solutions and the total number of recommended clustering dimensions for a given table. Based on the number of dimensions observed, either a multidimensional clustering solution or a RID based clustering index is recommended.

10 Claims, 5 Drawing Sheets

FIG. 5

```
      500
      EMPLOYEE
          ( EMPNO        CHAR(6)        NOT NULL,
            FIRSTNME     VARCHAR(12)    NOT NULL,
            MIDINIT      CHAR(1)        NOT NULL,
508 ────── LASTNAME      VARCHAR(15)    NOT NULL,
            WORKDEPT     CHAR(3)                 ,
504 ────── PHONENO      CHAR(4)                 ,
502 ────── HIREDATE     DATE                    ,
            JOB          CHAR(8)                 ,
            EDLEVEL      SMALLINT       NOT NULL,
            SEX          CHAR(1)                 ,
506 ────── BIRTHDATE    DATE                    ,
            SALARY       DECIMAL(9,2)            ,
            BONUS        DECIMAL(9,2)            ,
            COMM         DECIMAL(9,2)            ,
            PRIMARY KEY  (EMPNO))
```

510
EXPLAIN Table

| Index Name | Table | Creation Text  513 | Index Type | Columns |
|---|---|---|---|---|
| 512 Idx_LName | EMPLOYEE | CREATE INDEX Idx_LName ON EMPLOYEE (LASTNAME); | REG | LASTNAME |

510
EXPLAIN Table

| Index Name | Table | Creation Text  516 | Index Type | Columns |
|---|---|---|---|---|
| 514 Idx_LName | EMPLOYEE | CREATE INDEX Idx_LName ON EMPLOYEE (LASTNAME) CLUSTER ALLOW REVERSE SCANS; | CLUS | LASTNAME |

METHOD AND APPARATUS FOR AUTOMATIC RECOMMENDATION AND SELECTION OF CLUSTERING INDEXES

BACKGROUND OF THE INVENTION

1. Technical Field

The present invention relates to an improved database management system. In particular, the present invention relates to selecting clustering indexes in a database management system. Specifically, the present invention relates to automatic recommendation and selection of clustering indexes between multidimensional and record identifier (RID) based clustering indexes.

2. Description of Related Art

Data clustering is a storage methodology in which like or similar data records are grouped together. Data in a database may be clustered by use of a clustering index or multidimensional clustering. Multidimensional clustering (MDC) allows data to be ordered simultaneously along different dimensions.

The choice of which type of clustering should be used in a particular database design is a complex task. Various types of analysis need to be performed to determine which type of clustering design should be used in a database system. A database design specifies the physical and logical database data layout and definition of its schema including tables, indexes, etc.

One type of analysis performed involves using database workload queries and access patterns. In particular, a query optimizer is used to analyze the workload queries and consider query processing techniques, such as block index scan, block index only scan, block index Anding, block index ORing, and generates a query access plan. More information regarding this analysis may be obtained from "Efficient Query Processing for Multi-Dimensionally Clustered Tables in DB2", A Very Large Data Base Endowment (VLDB) 2003 proceeding by Bhattacharjee, B., Paddmanabhan, S., Malkemus, T., Lai, T., Cranston, L., and Huras, M., which is incorporated herein by reference.

Another type of analysis is the selection of clustering indexes that help to reduce query execution time and improve database system performance. Several techniques have been used for index selection. Automated index wizards have been used to simplify the index creation process. Some index wizards recommend clustered and non-clustered indexes. Examples of these types of systems include, for example, IBM Design Advisor, which is a product available from International Business Machines Corporation, and SQL Server Index Wizard, which is a product available from Microsoft Corporation. Some index wizards only recommend non-clustered indexes. One example of this type of approach is, for example, Oracle SQL Access Advisor, a product available from Oracle Corporation.

A clustering index is an indexing system in which values are maintained in sequence on the data pages. When a clustering index is present, the database manager maintains data rows in a database table in the same order as the column(s) in the index. The database manager may process queries that involve range predicates, such as 'BETWEEN', '<', and '>', 'GROUP BY', 'DISTINCT', or 'ORDER BY' (on the ordered column) and equality predicates, such as 'WHERE' clause, more efficiently by reducing the amount of I/O, since all similar values are grouped together for faster retrieval. Thus, by leveraging clustering indexes, database workloads that involve these kinds of queries may benefit immensely.

The process of deciding whether to create a clustering index and on which table columns currently involves investigating the data access patterns and the types of queries that are involved.

However, this type of investigation is a tedious and time consuming process for a database administrator to administer. The approach for this type of process is often a trial and error process because the database administrator has to constantly monitor the data access patterns and determine the columns that are most frequently referenced by their running queries. This type of approach wastes valuable human and system process time.

Therefore, it would be advantageous to have an improved method, apparatus, and computer instructions to automatically create, recommend, and select clustering indexes.

SUMMARY OF THE INVENTION

The present invention provides a method, an apparatus, and computer instructions in a data processing system for selecting and recommending clustering indexes. Baseline run time costs for executing workload queries for a database design are estimated through a query optimizer. Clustering of workload benefits based on clustering designs also is determined. The clustering of workload benefits involves modeling the benefits of multi-dimensional clustering and single dimension record identifier based index clustering, and having the query optimizer choose which form of clustering is preferable. The clustering of workload benefits is compared to the baseline run time costs. If the clustering workload benefits are greater than one of the baseline run time costs, clustering dimension solutions originating from a record identifier based index are identified. In response to selecting a clustering design based on the plurality of clustering dimension solutions, a number of recommended clustering dimensions for a database table are determined. If the number of recommended clustering dimensions is one, then a clustering index solution is recommended.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating an example implementation using the exemplary process described in FIG. 4 in accordance with a preferred embodiment of the present invention.

DETAILED DESCRIPTION OF THE PREFERRED EMBODIMENT

Figure 1:
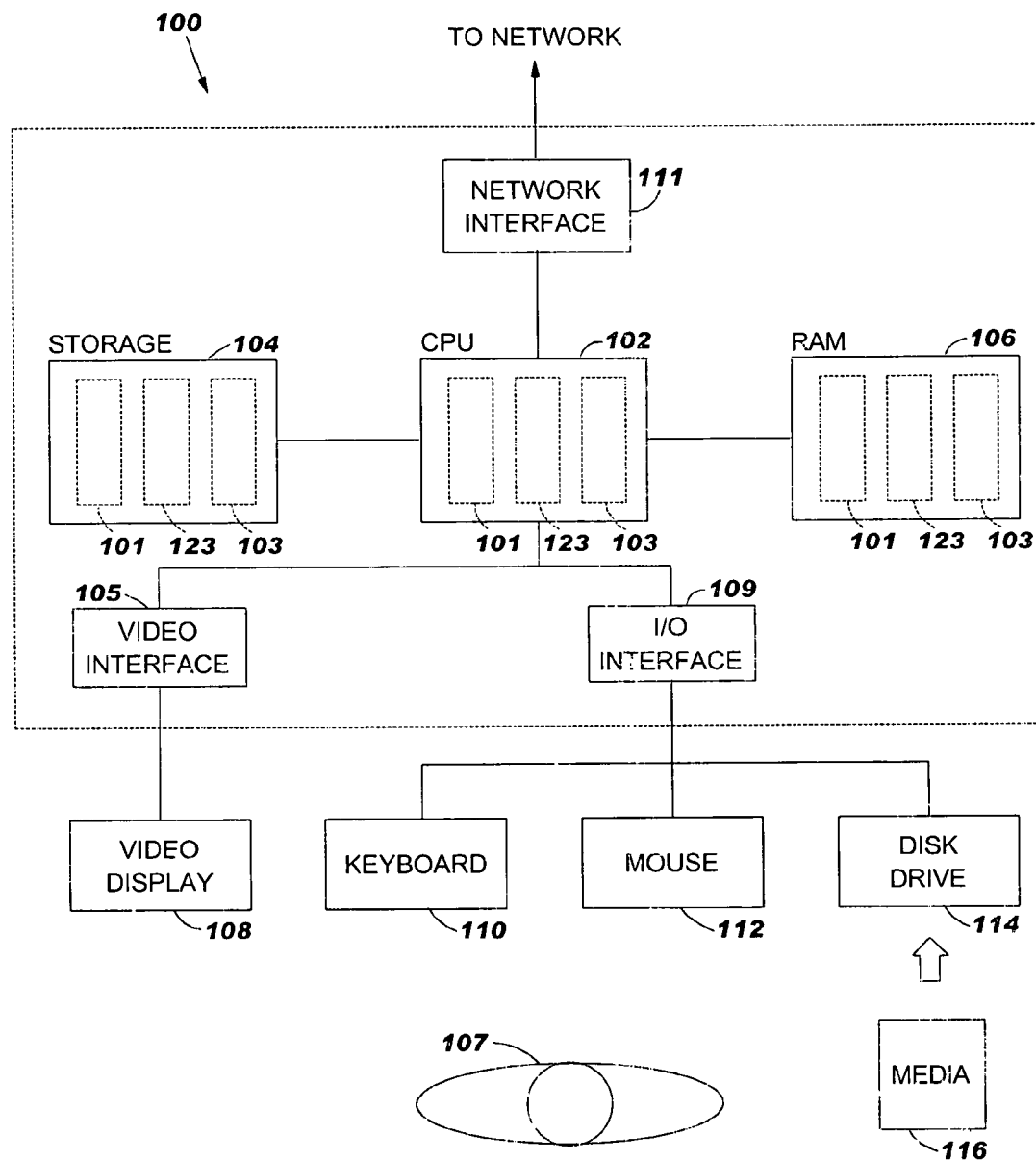
FIG. 1 is a schematic block diagram of a computer system which may provide an operating environment for practicing exemplary embodiments of the invention.

FIG. 1 shows an illustrative computer system 100 that may provide an operating environment for exemplary embodiments of the invention. The computer system 100 may include a central processing unit ("CPU") 102 connected to a storage unit 104 and to a random access memory ("RAM") 106. The CPU 102 may process an operating system 101, application software 103, and a database management system ("DBMS") 123 managing stored data records. The operating system 101, DBMS 123 and application software 103 may be stored in the storage unit 104 and loaded into RAM 106, as required. A user 107 may interact with the computer system 100 using a video display 108 connected by a video interface 105, and various input/output devices such as a keyboard 110, mouse 112, and disk drive 114 connected by an I/O interface 109. The disk drive 114 may be configured to accept computer readable media 116. Optionally, the computer system 100 may be network enabled via a network interface 111. It will be appreciated that the computer system 100 of FIG. 1 is illustrative, and is not meant to be limiting in terms of the type of computer system which may provide a suitable operating environment for practicing the present invention.

Figure 2:
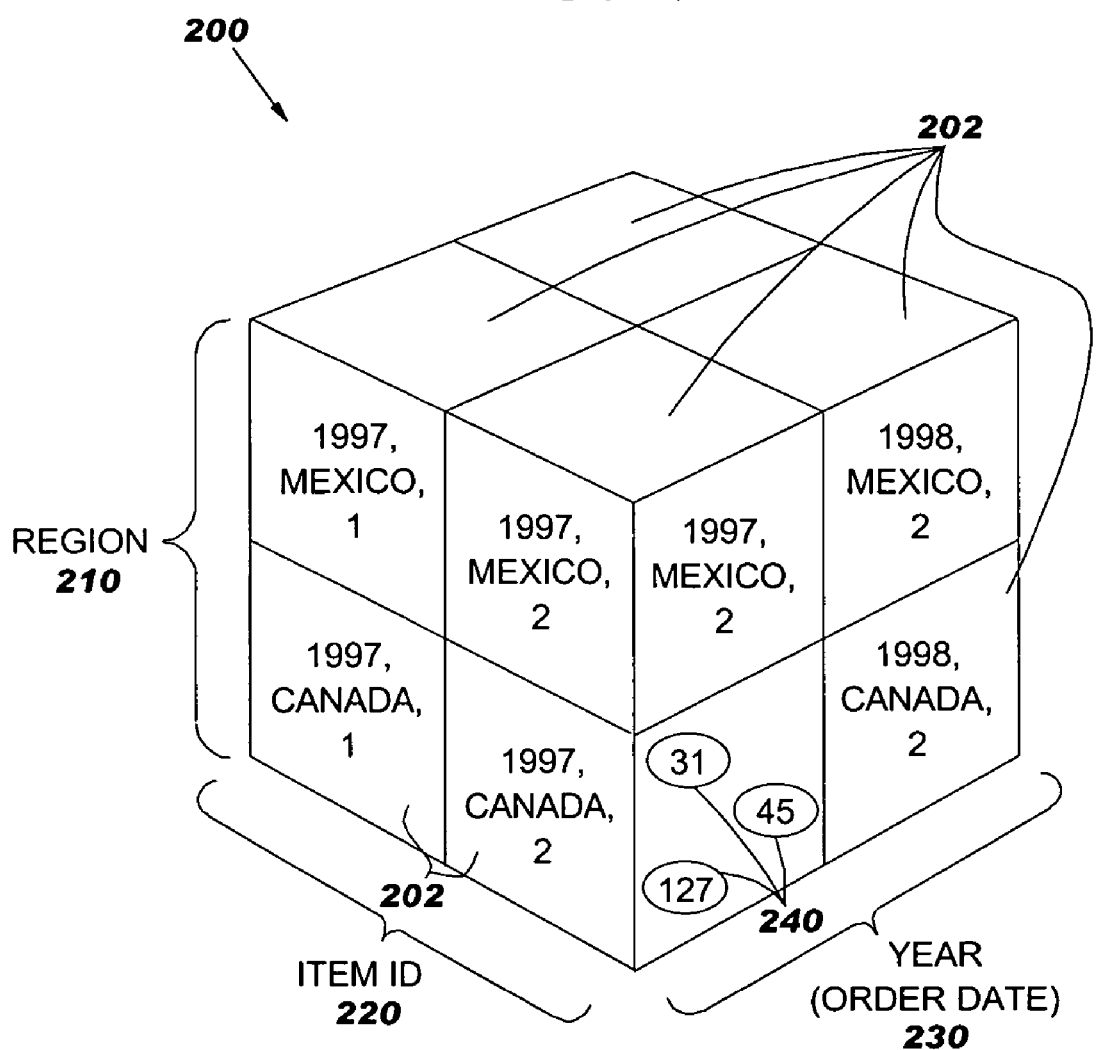
FIG. 2 is an illustrative example of an MDC table clustered along a number of dimensions in accordance with a preferred embodiment of the present invention.

FIG. 2 is an illustrative example of an MDC table 200 clustered along three dimensions in accordance with a preferred embodiment of the present invention. MDC table 200 may illustrate, for example, an MDC table structure created by the MDC implementation in IBM DB2™. In this illustrative example, the dimensions include a "region" 210, "itemId" 220, and "year(orderDate)" 230. MDC table 200 is depicted as a simple logical cube with two values for each dimension attribute. Thus, each cell 202 of FIG. 2 represents a portion of the table having a unique intersection of region 210, itemId 220 and year(orderDate) 230 values. Illustrative data blocks 240 represented as ovals are shown in one of cells 202 identified by the dimension values "1997, Canada, 2".

Referring back to FIG. 1, application software 103 may include data processing executable instructions for interacting with DBMS 123 and for execution of various methods in accordance with the teachings of the present invention. The computer executable code may be organized into "modules" for performing various functions. Each module may contain data processing system executable instructions that may be called upon to perform a specific function. Alternatively, the modules may form part of a larger set of data processing system executable instructions that may be compiled collectively.

As an illustrative example, DBMS 123 may include, for example, IBM DB2 Universal Database™ (UDB) V8.1 with an implementation of MDC. In the DB2 UDB implementation of MDC, each unique combination of dimension values forms a logical cell (e.g. cell 202 of FIG. 2) which is physically organized as blocks of pages. A block is a set of consecutive pages on a disk. Every page of a table is part of exactly one block, and all blocks of a table consist of the same number of pages. The clustering dimensions are individually indexed by B+ indexes known as dimension block indexes which have dimension values as keys and block identifiers as key data.

The DB2 UDB implementation of MDC can co-exist with other database features such as row based indexes, table constraints, materialized views, high speed load and mass delete. The benefit of these coexistence properties for example allows DB2 to perform index ANDing and index ORing between MDC dimension block indexes and traditional row based (RID) indexes within the same database.

In this example, a block index is created on each of the year (orderDate), region, and itemId attribute. A block index (BID) is much smaller than a record identifier (RID). A record identifier (RID) identifies a record in a database table. Typically, a RID consists of a 24 bit page number or longer, which identifies the page it belongs to and an 8 bit slot number which indicates the position of the record within a page. A BID is similar to a RID in structure except that at the leaf level the keys point to a block ID (BID) instead of a record ID (RID). A BID is made up of 24 bit page identifier or longer and an 8 bit slot. The 8 bit slot is zero from its definition. A BID only needs to be updated when a new block is added to a cell, or when a block is emptied and removed from a cell.

The present invention provides a method, an apparatus, and computer instructions for recommending and selecting a clustering index. In an illustrative embodiment, the mechanism of the present invention leverages a multidimensional clustering simulation component in DB2 Design Advisor to consider block index designs, including the current database design and all clustering as poor clustering, and calculates a value representing the cost to run the given workload with the examined design. DB2 Design Advisor is a product available from International Business Machines Corporation. This value is referred to as workload benefits.

A simulation of additional clustering is performed to determine estimated run time costs. During this simulation phase, both existing and virtual record identifier (RID) based indexes, whose columns can potentially be represented as multidimensional clustering (MDC) dimensions if the tables in which the indexes are based on are large enough for multidimensional clustering (MDC) consideration, are modeled by simulating clustering block indexes and updating of clustering statistics. The updated statistics, meaning virtual block statistics and increased RID clustering, are passed to a query optimizer for evaluation and the cost benefits to the workload or workload benefits are assessed.

If these block indexes and RID indexes are used in the query access plans, meaning that the cost is low and the benefit is high, their columns are recorded as beneficial to the workload as a result of clustering. In addition, the preference of the RID and MDC clustering by the query access plans also is recorded. The mechanism of present invention then continues to consider all columns that are beneficial to the workload by means of clustering and for an MDC solution. Some queries may prefer MDC access while other queries may prefer RID based index access. If the final MDC recommendation on the table has one dimension and the dimension has a majority of its benefit coming from a RID based access plans, a clustering index on this column or dimension is recommended.

When a table is multi-dimensionally clustered, the table data is organized along one or more dimensions. This organization affects existing RID indexes defined in the table by improving data access along the ordered dimension during query accesses. The benefit of clustering on a column is identified by evaluating the benefit of MDC clustering on a RID index based on that column.

Figure 3:
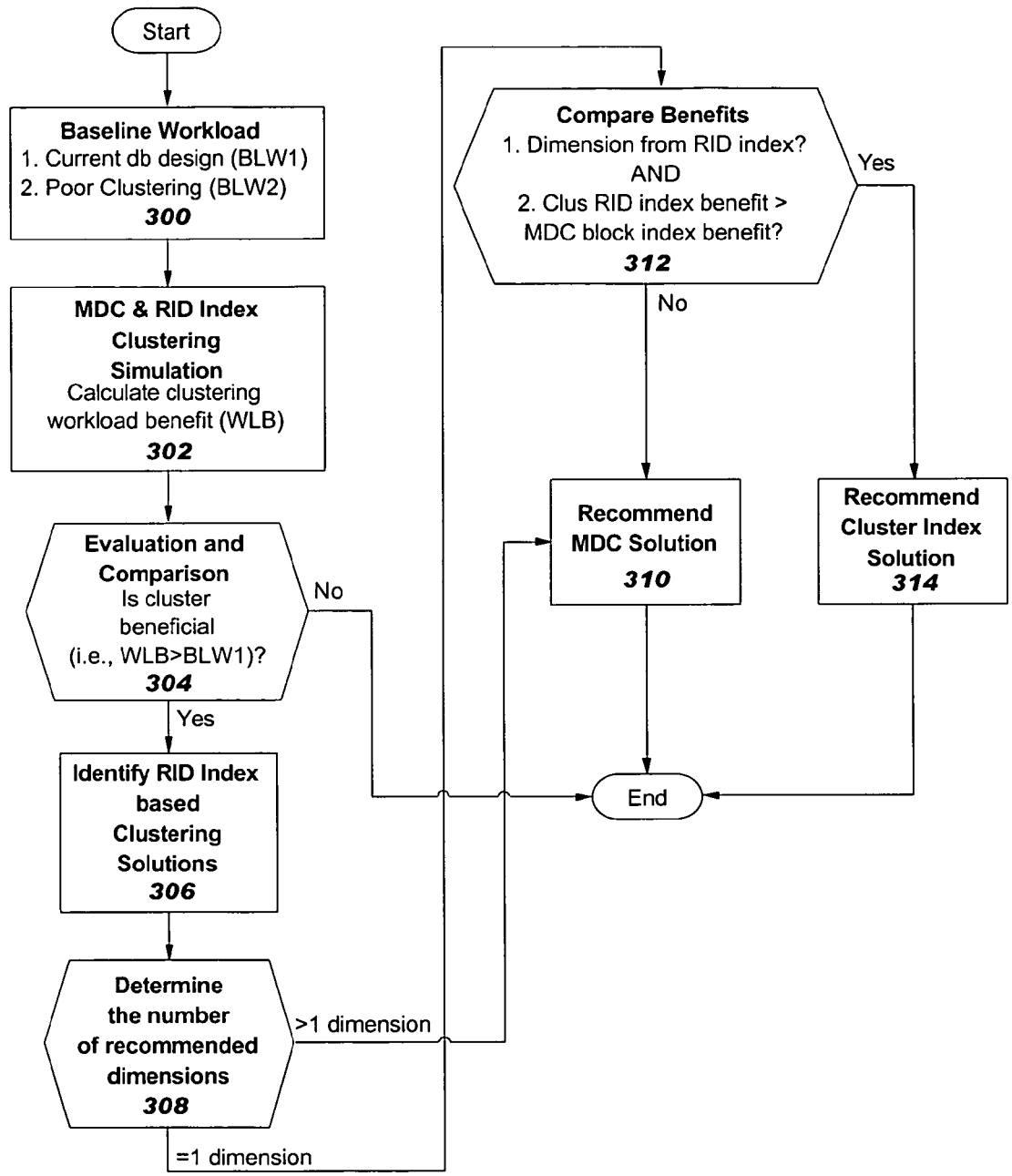
FIG. 3 is a flowchart of an exemplary process for automatic recommendation and selection of clustering indexes between multidimensional and record identifier (RID) based clustering indexes in accordance with a preferred embodiment of the present invention.

Turning now to FIG. 3, a flowchart of an exemplary process for automatic recommendation and selection of clustering indexes between multidimensional and record identifier (RID) based clustering indexes is depicted in accordance with a preferred embodiment of the present invention. The process illustrated in FIG. 3 may be implemented in a database management system, such as database management system 123 in FIG. 1.

As shown in FIG. 3, the process begins by calculating the cost of executing the workload queries with the current physical database design and with all clustering simulated for this design as poor clustering (step 300). Poor clustering refers to simulating a lower statistical clustering value X for table and/or index attributes. The value of X depends on the implementation. This step identifies clustering benefit even when the current database has some clustering already in place.

In one illustrative embodiment, the mechanism of the present invention uses a query optimizer to estimate the run time cost of executing the query workload. This cost estimate is a baseline run time cost estimate. The baseline run time cost estimate compares two baseline run time costs. The first baseline run time cost (BLW1) is estimated based on the current database design. Thus, there are no changes made to the database schema. The second baseline run time cost (BLW2) is estimated by forcing clustering on all existing indexes to be poor. The indexes are forced to be "poor" in this illustrative example by modifying the cluster index statistics to reflect a decrease or absence of clustering.

The selection of new virtual clustering designs is later compared to BLW2 to determine the relative benefit of clustering dimensions, and compared to BLW1 to obtain a fair assessment of potential benefit of a candidate clustering design for the overall system. A clustering design is a set of candidate dimensions that are possibly recommended for clustering. The potential benefit of the new clustering design is then compared to BLW1. In this example, BLW1 includes a pre-existing clustering design in the database.

Next, after the workload baselines are estimated, the MDC and RID index clustering simulation again passes the workload queries to the query optimizer to calculate the run time costs (step 302). However, this second assessment simulates the presence of additional clustering in two ways in these examples. First in one illustrative embodiment, a clustering dimension is simulated via a block index, for each range predicate, such as 'BETWEEN', '<', and '>', 'GROUP BY', 'DISTINCT', or 'ORDER BY', in the query workload. Second, the mechanism in the illustrative embodiment of the present invention increases the clustering on the RID indexes whose first column key can be used as an MDC dimension and if the underlying table is sufficiently large for MDC consideration. Once the simulation is performed, a set of candidate block indexes and high clustered RID indexes that were used in query access plans during the simulation are identified.

The query optimizer also estimates run time costs of executing workload queries with the new clustering designs and compares the estimated costs with the baseline cost BLW1 (step 304). If a new clustering design is considered beneficial, the evaluation then identifies clustering dimension solutions based on the RID index (step 306). In these illustrative examples, a new clustering design is considered beneficial if the cost is lower than BLW1, the current database design. Otherwise, clustering data in this database is not sufficiently beneficial for the given workload and the process terminates thereafter.

In step 306, clustering dimension solutions originating from a RID based index have an MDC block index benefit and a clustering RID index benefit associated, which indicate the estimated benefit of the respective data access. The index benefits are calculated during the query optimizer processing by comparing the estimated run time cost for statement in BLW2 (poor clustering) with run time cost for statement during clustering simulation. The difference in costs is the assumed benefit. The assumed benefit may be negative.

Once the candidate clustering dimension solutions are identified, a MDC design is selected in a manner in which a reasonable estimation of expected benefit of each candidate clustering solution is calculated by summing the benefits of the clustering dimensions. This selection is made using a technique, such as the one described in more detail in a patent application entitled Method, System, And Article Of Manufacture For Improving Execution Efficiency Of A Database Workload, Ser. No. 12/329,781, filed on Dec. 8, 2008, which is incorporated herein by reference. With this technique candidate clustering solutions are ranked based on expected benefit and evaluated in rank order to determine whether they satisfy specified storage expansion constraint. Processes to implement step 300, 302, 304, and 306 also are described in more detail in the patent application entitled Method, System, And Article Of Manufacture For Improving Execution Efficiency Of A Database Workload, Ser. No. 12/329,781, filed on Dec. 8, 2008, which is incorporated herein by reference.

Once a MDC design is selected using the technique described in the steps above, this design is examined and the number of recommended clustering dimensions for a given table is observed (step 308). If more than one clustering dimension is recommended for the given table, a MDC clustering solution is recommended (step 310) for more efficient overall data retrieval across all dimensions.

If only one clustering dimension is recommended for the given table, a comparison of the benefit attributed to this dimension across all workload statements is made and a determination is made as to whether the RID index based access benefits are greater than MDC block index access benefits (step 312). If the majority of the workload benefit comes from clustering RID index based access, a clustering index is recommended (step 314). Otherwise, a single dimension MDC solution on the table is made as a recommendation (step 310) with the process terminating thereafter.

As described above, both existing and virtual RID indexes are considered during the evaluation process. The verification process includes determining whether the newly recommended clustering index is equal to the existing clustering index defined on the table. The mechanism of the present invention checks for duplicate recommendations by comparing the index name and creator with the table name and creator. This verification process may be extended to verify clustering index keyparts, since each clustering index has multiple keyparts. Specifically, in the illustrative embodiment, a determination may be made as to whether the newly recommended clustering index keyparts are exact matches or a subset of the key parts belonging to an existing clustering index, if one exists on the same table.

Figure 4:
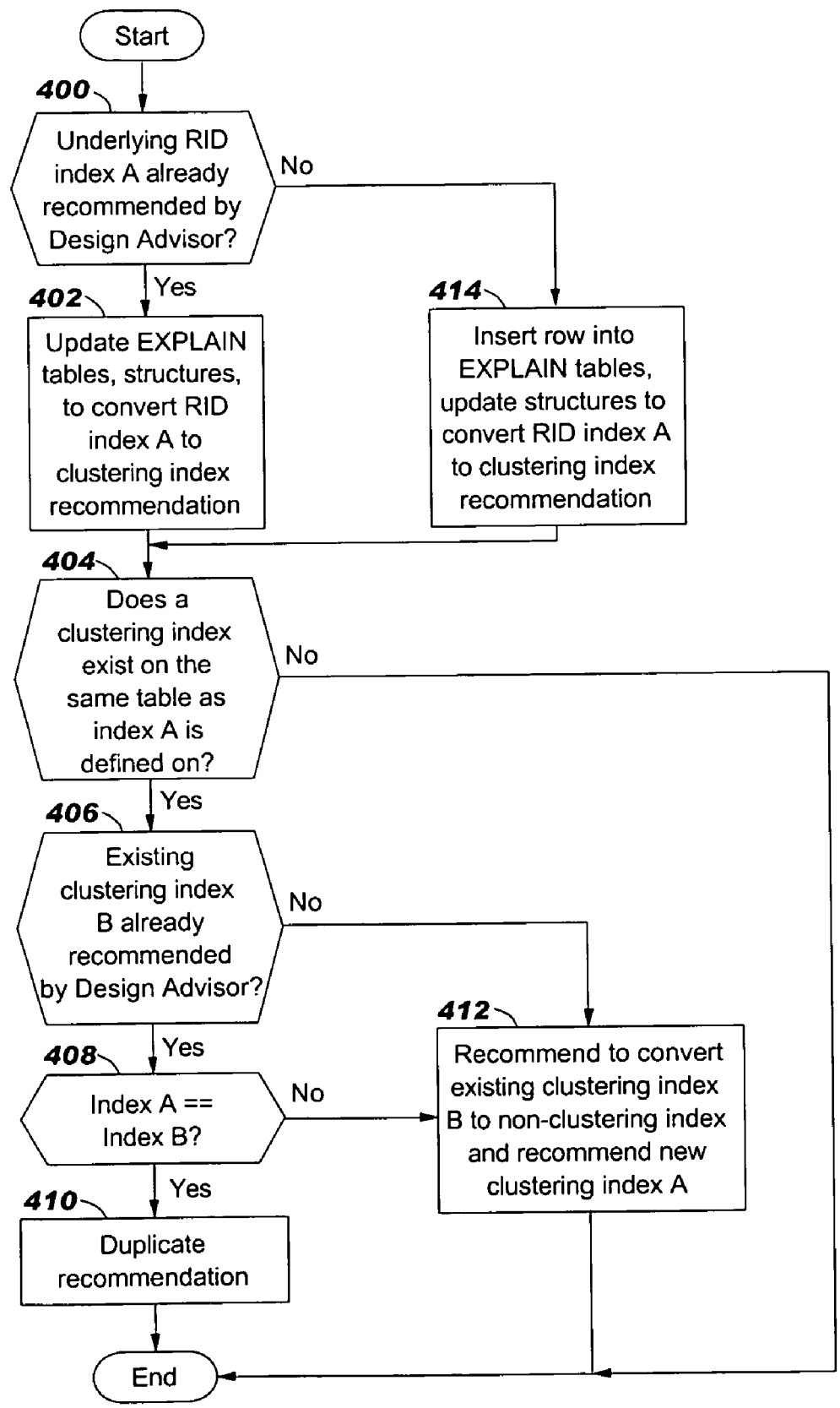
FIG. 4 is a flowchart of an exemplary process for recommending a clustering index if the majority of the workload benefit comes from clustering RID index based access in accordance with a preferred embodiment of the present invention.

Turning now to FIG. 4, a flowchart of an exemplary process for recommending a clustering index if the majority of the workload benefit comes from clustering RID index based access is depicted in accordance with a preferred embodiment of the present invention. FIG. 4 is a more detailed description of step 314 in FIG. 3.

When a determination is made that a RID based clustering index is beneficial to the workload, the underlying existing or virtual RID index has to be converted to a clustering index recommendation. In addition, a verification may be made as to whether any existing clustering indexes defined on the table are recommended to be converted to non-clustering RID indexes. In this illustrative implementation, DB2 Design Advisor is the index wizard used to recommend indexes. The mechanism of the present invention may be implemented using any index wizard.

As shown in FIG. 4, the process begins when the when a determination is made as to whether the underlying RID index, such as RID index A, has already been recommended by the index wizard (step 400). In these illustrative examples, the index wizard may be Design Advisor. For each candidate clustering RID index dimension, a boolean flag is associated to indicate that the dimension has originated from a RID index.

If RID index A has already been recommended, the necessary tables that contain the index recommendation and index structures are updated to convert RID index A to a clustering index recommendation (step 402). In DB2, the necessary EXPLAIN catalog tables are updated.

Next, a determination is made as to whether an existing clustering index is already present on the same table as the RID index A is defined on (step 404). Since only one clustering index may be defined on a table, converting existing clustering indexes to non-clustering indexes is recommended, because the newly recommended clustering index provides improved benefit to the workload. If no existing clustering index is present on the same table as the RID index A is defined on, the process terminates.

If the existing clustering index is present on the same table as RID index A is defined on, a determination is made as to whether the existing clustering index, such as clustering index B, has been recommended by the index wizard (step 406). It is possible that index wizard has already selected clustering index B as a favorable index to use in the workload. If clustering index B has not been recommended by the index wizard, such as Design Advisor, the process continues to step 412.

If clustering index B has been recommended by the index wizard, the present invention determines if the existing clustering index, clustering index B, is identical to the newly recommended index, RID index A (step 408). If clustering index B and RID index A are identical, a duplicate recommendation is present and all recommendation references to this index are removed (step 410) with the process terminating thereafter. Thus, the recommendation for the existing index in the table is removed, because recommending creation of a clustering index that already exists is redundant. However, turning back to step 408, if clustering index B and RID index A are not identical, the existing clustering index B is recommended to be converted to a non-clustering RID index and to recommend the new clustering index A (step 412). The process terminates thereafter.

With reference again to step 400, if RID index A has not been recommended, the necessary information is inserted into the same tables (step 414) with the process proceeding to step 404 as described above. The information includes, for example, EXPLAIN tables and index structures to indicate a clustering index recommendation.

Turning now to FIG. 5, a diagram illustrating an illustrative implementation using the process described in FIG. 4 is depicted in accordance with a preferred embodiment of the present invention. As shown in FIG. 5, employee table 500 is defined in a set of database tables contained in a database. In this example, employee table 500 includes three indexes: RID index Idx_HireDate on column HIREDATE 502, RID index Idx_PhoneNo on column PHONENO 504, and clustering index Idx_BDate on column BIRTHDATE 506.

Based on step 400 in FIG. 4, a determination is made as to whether Design Advisor has recommended a RID index that is beneficial for the given workload. In this example, Design Advisor recommended a RID index on column LASTNAME 508. The EXPLAIN table 510, would include entry 512, which reflects this recommendation. Entry 512 indicates a creation of RID index Idx_LName 513 on column LASTNAME 508.

From step 402 in FIG. 4, the process in the illustrative embodiment modifies EXPLAIN table 510 index creation text and index types, as shown in updated entry 514, to convert RID index Idx_LName to a clustering index. Entry 512 indicates a creation of clustering index Idx_LName 516 on column LASTNAME 508 and allows a reverse scan to be performed on the clustering index. In addition to creation text and index types, the mechanism of the present invention also updates internal structures and additional fields.

From step 414 in FIG. 4, if Design Advisor fails to recommend any RID index that is beneficial to the workload, the mechanism of the present invention inserts a row into EXPLAIN table 510 to indicate a clustering index recommendation.

From step 404 in FIG. 4, the mechanism of the present invention determines that an existing clustering index is defined on employee table 500. In this example, clustering index Idx_BDate is already defined on employee table 500. From step 406 in FIG. 4, the mechanism of the present invention determines that Idx_BDate has not been recommended by Design Advisor. Therefore, the mechanism of the present invention converts clustering index Idx_BDate to a non-clustering index.

In order to convert Idx_BDate to a non-clustering RID index, the process in the illustrative embodiment of the present invention drops the Idx_BDate index and recreates the index as a RID index with the following statement:

DROP INDEX Idx_BDate;

CREATE INDEX Idx_BDate on EMPLOYEE (BIRTHDATE); Once the clustering index Idx_BDate is converted to a non-clustering RID index Idx_BDate, the mechanism of the present invention recommends the creation of a new clustering Idx_LName index using the following statement:

CREATE INDEX Idx_LName ON EMPLOYEE (LASTNAME) CLUSTER ALLOW REVERSE SCANS.

If the user decides to implement the recommendation provided by the present invention, the DROP AND CREATE INDEX statements are executed. In addition, performing table reorganization and statistics collection after the creation of new indexes is recommended to ensure that all database statistics are updated.

Thus, the present invention provides a method, apparatus, and computer instructions for selection and recommendation of clustering indexes and chooses between the RID based indexes and MDC block indexes. In an illustrative embodiment, a mechanism of the present invention uses two baseline cost estimates to compare with the calculated workload benefit for a given query workload. This mechanism then evaluates and compares the workload benefit with the baseline costs and identifies clustering dimension solutions based on the RID index. The number of recommended dimensions is identified and either MDC or RID based clustering index is recommended in these illustrative examples. In this manner, the selection of clustering indexes may now be automated, and database administrators may save time and effort in determining what clustering indexes should be selected for a database.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system, which comprises a processor and memory, for selecting clustering indexes, the method comprising:

determining a plurality of baseline run time costs for executing workload queries for a database design;

simulating multidimensional clustering and record identifier based index clustering to determine clustering workload benefits based on a plurality of clustering designs, wherein the simulations comprises simulations a clustering dimension for each range predicate in a query workload using a multidimensional clustering block index;

comparing the clustering workload benefits to the plurality of baseline run time costs; if the clustering workload benefits are greater than one of the plurality of baseline run time costs, identifying a plurality of clustering dimension solutions originating from a record identifier based index, wherein identifying step comprises determining a multidimensional clustering block index benefit and a record identifier based index benefit associated with each clustering dimension solution, wherein the multidimensional clustering block index benefit indicates an estimated benefit for data access using the multidimensional clustering block index and wherein the record identifier based index benefit indicates an estimated benefit for data access using the record identifier based clustering index;

responsive to a selection of a clustering design based on the plurality of clustering dimension solutions, identifying a number of recommended clustering dimensions for a database table;

if more than one recommended clustering dimension is identified, selecting multidimensional clustering block index;

if only one recommended clustering dimension is identified as a recommended clustering dimension, determining whether a majority of the clustering workload benefits is obtained from one of a record identifier based index and a multidimensional clustering block index;

if a majority of the clustering workload benefits is obtained from the record identifier based index, selecting the record identifier based index as a clustering index for the recommended clustering dimension; and if a majority of the clustering workload benefits is obtained from the multidimensional block index, recommending multidimensional clustering for the database table.

2. The method of claim 1, wherein the determining step comprises:

identifying a first baseline run time cost for the plurality of baseline run time costs using a current database design; and identifying a second baseline run time cost for the plurality of baseline run time costs using a poor clustering database design.

3. The method of claim 1, wherein the simulating step comprises:

increasing clustering on the record identifier based indexes, wherein a first column key of the record identifier indexes is used as a clustering index and an underlying database table of the record identifier based indexes is large enough for multidimensional clustering consideration.

4. The method of claim 1, wherein the step of selecting the record identifier based index as the clustering index for the recommended clustering dimension comprises:

determining whether the record identifier based index for the recommended clustering dimension is recommended by a query optimizer, wherein the query optimizer analyzes workload queries and access patterns; and if the record identifier based index is recommended by the query optimizer, updating existing tables and index structures to convert the record identifier based index recommendation to a clustering index recommendation.

5. The method of claim 4, further comprising:

if the record identifier based index is not recommended by the query optimizer, inserting a row into necessary tables and updating existing structures to convert the record identifier based recommendation to a clustering index recommendation, wherein the necessary tables include recommendations of indexes.

6. The method of claim 5, further comprising:

determining whether an existing clustering index is present on a same table as a newly recommended clustering index is defined on; and if the existing clustering index is present on the same table as the newly recommended clustering index is defined on, determining whether the existing clustering index is recommended by the query optimizer.

7. The method of claim 6, further comprising:

if the existing clustering index is recommended by the query optimizer, determining whether the clustering index is identical to the existing clustering index present in the catalog table; and if the clustering index is identical to the existing clustering index present in the catalog table, removing recommendation references to the existing clustering index.

8. The method of claim 7, further comprising:

if the existing clustering index is not identical to the clustering index present in the catalog table, converting the existing clustering index to a non-clustering index.

9. The method of claim 8, wherein the converting step comprises:

dropping the existing clustering index; and creating a non-clustering index in lieu of the existing clustering index.

10. The method of claim 5, wherein the converting step for converting the record identifier based index to a clustering index comprises:

creating a clustering index for the record identifier based index using a cluster keyword.

* * * * *